United States Patent [19]

Hoshino

[11] 3,958,538

[45] May 25, 1976

[54] GASEOUS IGNITION SYSTEM FOR INTERNAL COMBUSTION ENGINE

[75] Inventor: Yasunari Hoshino, Yokohama, Japan

[73] Assignee: Nissan Motor Co., Ltd., Yokohama, Japan

[22] Filed: Mar. 3, 1975

[21] Appl. No.: 554,551

Related U.S. Application Data

[62] Division of Ser. No. 359,917, May 14, 1973, abandoned.

[30] Foreign Application Priority Data

May 15, 1972 Japan.............................. 47-47167

[52] U.S. Cl........................... 123/8.09; 60/39.82 C; 60/39.82 P; 123/1 A; 123/119 E; 123/143 R; 123/DIG. 9; 239/533

[51] Int. Cl.²............................................... F02B 53/12

[58] Field of Search............... 60/39.82 C, 39.82 P; 123/8.09, 8.13, 1 A, 39, 119 E, 143 R, 143 B, DIG. 9; 239/453, 533

[56] References Cited

UNITED STATES PATENTS

| 1,505,100 | 8/1924 | Lightfoot................... 123/143 B X |
| 2,897,649 | 8/1959 | Reddy ......................... 60/39.82 P |
| 3,339,848 | 9/1967 | Geiger ............................. 239/453 |
| 3,469,793 | 9/1969 | Guertler............................ 239/533 |
| 3,508,530 | 4/1970 | Clawson......................... 123/8.09 X |
| 3,543,736 | 12/1970 | Suzuki et al................ 123/143 B X |

FOREIGN PATENTS OR APPLICATIONS

| 975,500 | 10/1950 | France............................. 239/533 |
| 1,032,062 | 3/1953 | France............................. 239/533 |
| 474,978 | 4/1929 | Germany.......................... 239/533 |
| 947,284 | 1/1964 | United Kingdom............... 123/8.09 |

*Primary Examiner*—Carlton R. Croyle
*Assistant Examiner*—Michael Koczo, Jr.

[57] ABSTRACT

An internal combustion engine comprising a gaseous ignition system which employs a high temperature and high pressure gaseous mixture obtained by decomposing hydrogen peroxide.

4 Claims, 4 Drawing Figures

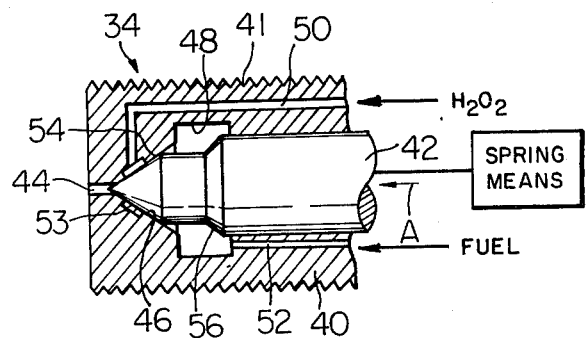
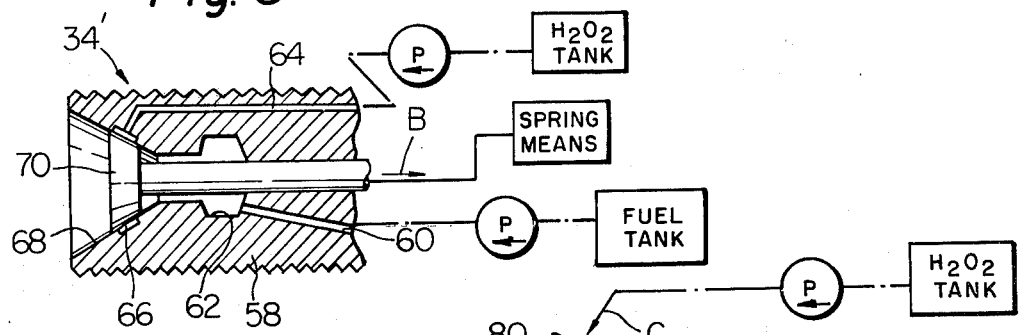
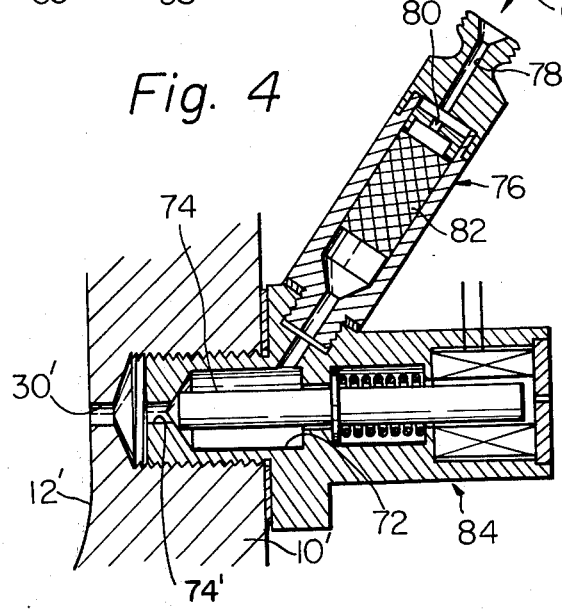

GASEOUS IGNITION SYSTEM FOR INTERNAL COMBUSTION ENGINE

This is a division of application Ser. No. 359,917, fled May 14, 1973, and now abandoned.

The present invention relates to gaseous ignition systems for internal combustion engine, and more specifically to gaseous ignition systems particularly effective when used as ignition systems for rotary internal combustion engines of the trochoidal type, in which a multi-lobed rotor is mounted for rotational movement within a housing having a basically epitrochoidal profile to form working chambers which vary in volume during engine operating phases of intake, compression, power, and exhaust.

In the trochoidal engine, firing always takes place at the same location, and, furthermore, there is no provision for cooling of the ignition zone by intake of a cool and fresh air-fuel mixture, nor does firing take place alternatively at other locations as in a conventional reciprocating engine, and the ignition frequency of the rotary engine is usually much higher than that of a reciprocating engine. Furthermore, a spark plug cannot protrude into the firing or combustion chamber, but is installed in either the peripheral or an end wall, with a small ignition aperture open to the firing chamber to transmit the spark. The aperture has to be small in order to prevent leakage of gases between adjacent working chambers past apex seals of the rotor, and it is difficult to replace completely the exhaust gases with a fresh charge around the spark plug, causing the spark to misfire the engine under certain conditions. Ignition of a combustible charge of the engine is thus difficult, particularly during low speed operation unless the combustible charge is made considerably rich.

Heretofore, several appreciable improvements have been made and put in use to ensure stable spark ignition for this engine type, such as mounting two spark plugs spacedly about the housing inner surface, or providing a "high tension" ignition system. These improvements, although somewhat effective, result in a considerably increased cost as compared to ignition systems of conventional reciprocating engines.

The present invention aims at providing a rotary internal combustion comprising a gaseous ignition system, thereby obviating the above mentioned inherent disadvantages of spark ignition systems.

It is therefore an object of the present invention to provide an $H_2O_2$ ignition system for a rotary internal combustion engine utilizing decomposition products of hydrogen peroxide to ignite a combustible charge.

It is a further object of the present invention to provide an $H_2O_2$ ignition system for a rotary internal combustion engine utilizing thermal decomposition products of hydrogen peroxide to ignite a combustible charge.

It is still a further object to provide an injection nozzle for fuel and hydrogen peroxide for use in an embodiment of an $H_2O_2$ ignition system according to the present invention.

It is still another object of the present invention to provide a gaseous ignition system for a rotary internal combustion engine utilizing catalytic decomposition products of hydrogen peroxide.

As will be shown in greater detail hereinafter, there is provided a technique for producing high pressure and temperature gaseous decomposition products of hydrogen peroxide, and for using these gaseous products to ignite an engine combustible charge. Since, as will be understood from the detailed descriptions of preferred embodiments of the present invention which follow hereinbelow, the decomposition products spout into a combustion chamber of the engine through an ignition aperture, the above mentioned inadequacy inherent in the spark-ignition rotary engine is eliminated, i.e. the failure of a spark to ignite the engine combustible mixture because exhaust gases in the ignition aperture are not removed before a fresh charge is fired.

Other objects and advantages of the present invention will become apparent from the following description with reference being made to the accompanying drawings, in which:

FIG. 2 is a fragmentary enlarged diagrammatic view of the injector nozzle shown in FIG. 1;

FIG. 3 is a fragmentary enlarged sectional diagrammatic view of another example of the injector nozzle shown in FIG. 1; and FIG. 4 is a fragmentary sectional view of another embodiment of a rotary engine of the present invention.

Figure 1:
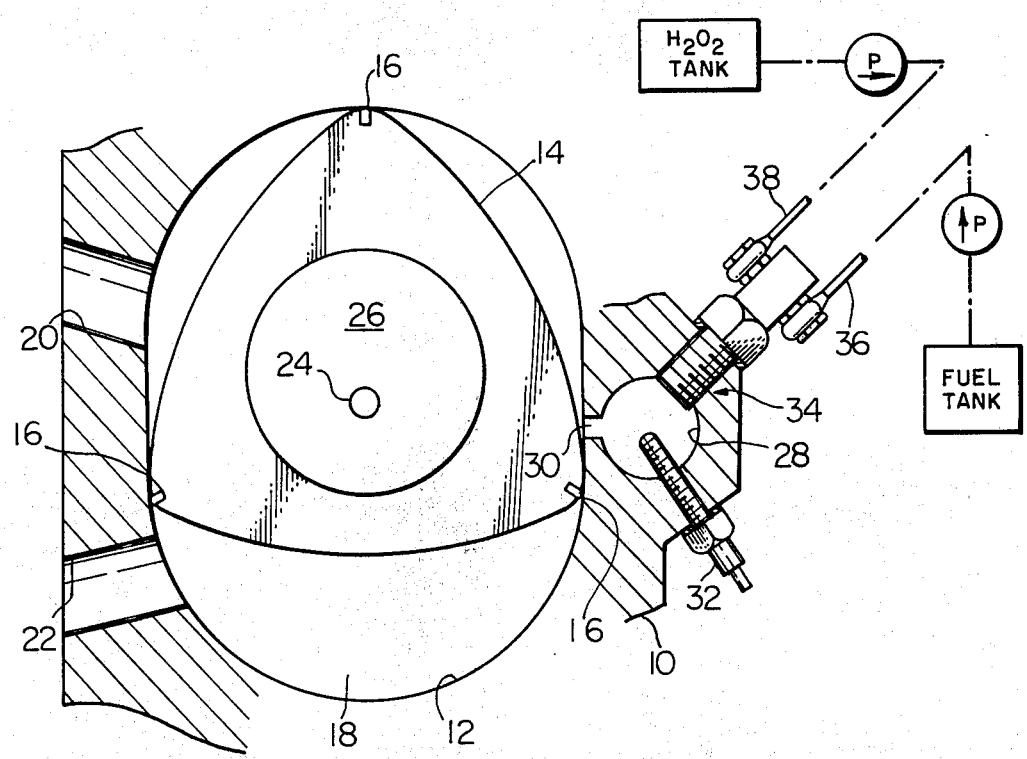
FIG. 1 is a fragmentary view of an embodiment of a rotary engine of the present invention showing an ignition chamber in section, an injector nozzle and a glow plug.

Referring to FIG. 1, there is shown a general view of a trochoidal type rotary piston engine, having a housing 10 with an epitrochoidal inner surface 12, and an eccentrically rotatable rotor 14 formed with three lobes. Each rotor lobe apex (no numeral) is provided with an apex seal 16 sweeping the inner surface 12 of the housing 10. The housing 10 is closed by a pair of end walls, of which only one, a rear end wall 18 is shown. The housing 10 is provided with an inlet port 20 and an outlet port 22, although such ports may alternatively be provided in one or both end walls. A shaft 24 extends through the end walls and is aligned with the longitudinal centre axis of the housing, and has an eccentric portion 26 on which the rotor 14 is mounted. An air-fuel combustible mixture is supplied into the engine through the inlet port 20 in a conventional manner.

An ignition or auxiliary chamber 28 is shown formed in the housing 10 and communicates with the interior of the inner surface 12 of the housing 10 through an ignition aperture 30 in the inner surface 12, although such an aperture and auxiliary chamber may equally well be provided in either of the end walls. The auxiliary chamber 28 herein shown is substantially spherical.

Mounted in the peripheral housing 10 is a glow plug 32 of a conventional type, which is used for starting the engine. The glow plug 32 projects into and is exposed to the interior of the auxiliary chamber 28. Exposed also to the interior of the auxiliary chamber is an injector nozzle 34 for injecting a mixture of an engine fuel and hydrogen peroxide into the auxiliary chamber 28.

A fuel feed line 36 and a hydrogen peroxide feed line 38 communicate with the injector nozzle 34.

FIG. 2 illustrates one example of a general configuration of the injector nozzle 34 shown in FIG. 1. The injector nozzle 34 comprises an injector body 40 and an injection control needle 42. The injector body 40 has formed thereon an external threaded portion 41 by which the injector nozzle 34 can be detachably mounted in the peripheral housing 10, as shown in FIG. 1. Formed in the injector body 40 is a discharge channel 44 having an opening in an end wall (no numeral) of the injector body 40 facing the interior of the auxiliary chamber 28. The injector body 40 has also formed therein a conical valve seat 46 communicating with the discharge channel 44, a valve chamber 48 communicating with the valve seat 46, and two passageways 50 and 52. The passageway 50 leads to an annular groove 53 formed in the wall defining the valve seat 46, and the passageway 50 is supplied with hydrogen peroxide under a pressure which is above atmospheric pressure from the hydrogen peroxide feed line 38. The passageway 52 leads to the valve chamber 48 and is supplied with fuel under a pressure which is above atmospheric pressure from the fuel feed line 36.

The injection control needle 42 has formed at its leading end portion or at its tip portion (no numeral) a conical section 54 mating with the conical valve seat 46, and a conical shoulder 56 exposed to and subjected to fluid pressure in the valve chamber 48. The injection control needle 42 is biased in a direction of an arrow A toward the conical valve seat 46 by suitable spring means, as diagrammatically shown.

As will be seen from FIG. 2, the annular groove 53 formed in the valve seat 46 faces and is closed by an outer oblique face of the conical section 54.

Thus, fluid pressure in the passageway 50 will act on the conical section 54 as the conical section 54 seats on the valve seat 46, urging the injection control needle 42 in a direction opposite to that of the arrow A against the force of the compression spring. Of course, the fluid pressure in the valve chamber 48 will act on the shoulder 56 to also urge the injection control needle 42 against the force of the compression spring in a direction opposite to that of the arrow A.

In the embodiment shown in FIG. 1 and FIG. 2, fuel under a pressure which is above atmospheric pressure is fed through the fuel feed line 36 into the valve chamber 48 by a pump (not shown) in a timed relationship with the engine rotation. Also, hydrogen peroxide under a pressure which is above atmospheric pressure is fed through the hydrogen peroxide feed line 38 into the annular groove 53. Thus the injection control needle 42 opens the discharge channel or jet 44 when pressurized fuel and hydrogen peroxide are supplied into the valve chamber 48 and the annular groove 53 respectively to inject fuel and hydrogen peroxide into the auxiliary chamber 28 via the discharge channel or jet 44, in the form of a jet stream.

FIG. 3 illustrates another example of an injector nozzle which can be used in the embodiment shown in FIG. 1. The injector nozzle shown in FIG. 2 is indicated by a reference numeral 34'. Indicated by a reference numeral 58 is a injector body which is formed therein a fuel passageway 60 leading to a valve chamber 62. A hydrogen peroxide passageway 64 leads to an annular groove 66 formed in a conical valve seat 68 which communicates with the auxiliary chamber 28 (see also FIG. 1), the annular groove 66 being shown as being closed by a valve 70. The valve 70 is biased in the direction of an arrow B by a extension spring suitable spring means, as diagrammatically shown, normally seating the valve 70 onto the valve seat 68 to block the groove 66. The valve 70 is subjected to fluid pressure in the valve chamber 62, as shown in FIG. 3.

In this example, only fuel under a pressure higher than atmospheric pressure is supplied through the fuel passageway 60 into the valve chamber 62 in a timed relationship with the engine rotation, while hydrogen peroxide is supplied to the groove 66 through the hydrogen peroxide passageway 64. A head (no numeral) of the valve 70 is moved to open the valve 70 when fuel under a pressure higher than atmospheric pressure is supplied into the valve chamber 62, thus allowing fuel to flow past the groove 66. Hydrogen peroxide is thus drawn out from the passageway 64 by the flow of fuel when the valve 70 is open. A fuel and hydrogen peroxide mixture jet stream is thus injected from the injection nozzle 34' into the auxiliary chamber 28.

The operation of the rotary engine as decribed with reference to FIGS. 1 and 2, or FIGS. 1 and 3 will now be described.

When starting the engine, the auxiliary chamber 28 is heated by the glow plug 32 in the same manner employed in a diesel engine starting operation. After the auxiliary chamber 28 has been heated, the engine is cranked and a hydrogen peroxide-fuel mixture is injected into the auxiliary chamber 28. The thus injected hydrogen peroxide of the mixture will readily be decomposed in the auxiliary chamber 28 by the heat therein as follows;

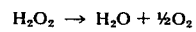

$$H_2O_2 \rightarrow H_2O + \tfrac{1}{2}O_2$$

The fuel of the mixture will react with the thus produced oxygen to produce a high temperature, high pressure gas mixture. The gas mixture then flows into the interior of the inner surface 12 and will ignite a combustible charge therein.

After the engine has been started, the auxiliary chamber 28 will be maintained at high enough temperature to enable the thermal decomposition of hydrogen peroxide in a timed relationship with the engine rotation. Thus, the engine combustible charge is ignited and continuous operation of the engine is possible.

FIG. 4 illustrates another embodiment of the present invention. There is shown therein an inner peripheral portion of a housing 10' with a basically epjitrochoidal inner surface 12'. A reference numeral 30' indicates an ignition aperture.

Indicated by a reference numeral 84 is a solenoid actuated valve. The solenoid actuated valve 84 has an auxiliary chamber 72 having a discharge spout 72' opening into a combustion chamber of the engine through the ignition apperture 30', and a valve element 74 to close and open the spout 72'. Indicated by a reference numeral 76 is an injector unit. The injector unit 76 includes a passageway 78 and a metering device 80, which communicate with the valve chamber 72 via a catalyst 82, which is made of, for example, silver plated steel wires.

In this embodiment, hydrogen peroxide is continuously supplied to the catalyst 82 by a pump from a hydrogen peroxide tank through the passageway 78 and the metering device 80 in the direction of an arrow C. Hydrogen peroxide is readily catalytically decomposed as follows:

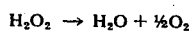

$$H_2O_2 \rightarrow H_2O + \tfrac{1}{2}O_2$$

by contact with the catalyst and provides a gaseous mixture of $H_2O$ and $O_2$ at a temperature of around 700°C with a pressure of about 20kg/cm² in the valve chamber 72 of the solenoid actuated valve 84. Under the control of the solenoid actuated valve 84, the gaseous mixture spouts into the interior of the inner surface 12' via the ignition aperture 30', in timed relationship with the engine rotation.

As is now understood from he foregoing description, it has been attained by the present invention that the engine combustible charge is stably ignited even during low speed operation of the rotary internal combustion engine because the high pressure of the decomposition products will completely remove remaining exhaust gas from around the ignition aperture. Thus it will be appreciated that stable operation of the rotary internal combustion engine over the whole operating range, i.e. low speed and high speed operations, is possible.

Furthermore according to the present invention, stable operation of the rotary internal combustion engine on a relatively lean air-fuel mixture, or non-ignitable combustible charge compare with a conventional rotary engine, is possible over the whole operating range.

What is claimed is:

1. In combination with a trochoidal type rotary piston internal combustion engine in which a multi-lobed rotor is mounted for rotational movement within a housing having a basically epitrochoidal profile to form a main combustion chamber and which is operated on a combustible charge supplied to the combustion chamber,
   a gaseous ignition system comprising:
   an auxiliary chamber communicating with the main combustion chamber through an ignition aperture; and
   an injector nozzle having an injector body including a valve chamber communicating with a fuel source under pressure in timed relation with engine revolution of the engine and a valve seat connecting the valve chamber, through a discharge channel, with the auxiliary chamber, the valve seat being formed with a port therein which communicates with a hydrogen peroxide source under pressure, and having an injection control valve means yieldably biasing said injection control valve in one direction toward a valve closing position to engage the valve seat to close the port and to block communication between the valve chamber and the auxiliary chamber, the injection control valve having an area exposed to fluid pressure in said valve chamber to be urged in the opposite direction toward a valve opening position against yieldably biasing force.

2. A trochoical type rotary piston internal combustion engine as claimed in claim 1, further in combination therewith of: a glow plug exposed to the interior of the auxiliary chamber.

3. In combination with a trochoidal type rotary piston internal combustion engine in which a multi-lobed rotor is mounted for rotational movement within a housing having a basically epitrochoidal profile to form a main combustion chamber and which is operated on combustible charge supplied to the main combustion chamber;
   a gaseous ignition system comprising:
   an auxiliary combustion chamber communicating with the main combustion chamber through an ignition aperture; and
   an injector nozzle having an injector body including a valve chamber communicating with a fuel source under pressure in timed relation with engine revolution of the engine and a valve seat connecting the valve chamber with the auxiliary chamber, the valve seat being formed with a port therein which communicates with a hydrogen peroxide source under pressure in timed relation with engine revolution with the engine, and having an injection control valve, means yieldably biasing said injection control valve in one direction toward a valve closing position to engage the valve seat to close the port and to block communication between the valve chamber and the auxiliary chamber, the injection control valve having a first area exposed to fluid pressure in the port and a second area exposed to fluid pressure in the valve chamber to be urged in the opposite direction toward opening position against yieldably biasing force.

4. A trochoidal type rotary piston internal combustion engine as claimed in claim 3, further in combination therewith of: a glow plug exposed to the interior of the auxiliary chamber.

* * * * *